(12) United States Patent
Bennett

(10) Patent No.: US 6,412,005 B1
(45) Date of Patent: Jun. 25, 2002

(54) METHOD AND APPARATUS FOR PROVIDING SERVICE TO ENTITIES

(75) Inventor: Jon C. R. Bennett, Sudbury, MA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 08/917,392

(22) Filed: Aug. 25, 1997

(51) Int. Cl.$^7$ .............................................. G06F 15/173
(52) U.S. Cl. ..................... 709/226; 709/104; 370/395.4
(58) Field of Search ................................ 709/100, 226, 709/103, 104; 370/232, 395.4, 395.41, 395.42

(56) References Cited

U.S. PATENT DOCUMENTS

| | | | | |
|---|---|---|---|---|
| 5,341,477 A | * | 8/1994 | Pitkin et al. ................. | 709/226 |
| 5,381,546 A | * | 1/1995 | Servi et al. .................. | 709/102 |
| 5,701,292 A | * | 12/1997 | Chiussi et al. ............... | 370/232 |
| 5,781,531 A | * | 7/1998 | Charny ........................ | 370/395 |
| 5,886,993 A | * | 3/1999 | Ruszczyk et al. ............ | 370/451 |
| 5,905,711 A | * | 5/1999 | Chiussi et al. ............... | 370/232 |
| 5,982,748 A | * | 11/1999 | Yin et al. .................... | 370/232 |
| 6,130,878 A | * | 10/2000 | Charny ........................ | 370/395 |
| 6,157,654 A | * | 12/2000 | Davis ........................... | 370/395 |

* cited by examiner

Primary Examiner—Patrice Winder
(74) Attorney, Agent, or Firm—Ansel M. Schwartz

(57) ABSTRACT

The present invention pertains to an apparatus for providing service to entities. Also, the apparatus comprises a scheduler for dynamically scheduling when the first and second entities receive service from the server. The scheduler comprises a controller which chooses entities to receive service by the server based on a weighting factor corresponding with an entity. The controller dynamically changes the weighting factor corresponding with the entity as a function of a desired condition and time. The present invention, also, pertains to a method for serving entities. The method comprises the steps of providing service to a first entity by a server at a first rate based on a first weighting factor corresponding to the first entity during a first time period. Next there is the step of providing service to a second entity by the server at a second rate based on a second weighting factor corresponding to the second entity during the first time period. Then there is the step of changing the first weighting factor and second weighting factor dynamically to a third weighting factor and a fourth weighting factor, respectively, corresponding to the first entity and second entity, respectively. Next there is the step of providing service to the first entity by the server at a third rate based on the third weighting factor corresponding to the first entity during a second time period. Then there is the step of providing service to the second entity by the server at a fourth rate based on the fourth weighting factor corresponding to the second entity during the second time period.

3 Claims, 2 Drawing Sheets

METHOD AND APPARATUS FOR PROVIDING SERVICE TO ENTITIES

FIELD OF THE INVENTION

The present invention is related to a telecommunications system. More specifically, the present invention is related to a scheduler for a telecommunications system which dynamically allocates bandwidth to entities requesting service from a server of the telecommunications system.

BACKGROUND OF THE INVENTION

In most asynchronous based networks, there are times when service from a server, such as a router or a switch or a CPU, must be allocated to more than one entity, such as a port, requesting service from the server. This is because at such times, more than one entity is requesting service of the server. Heretofore, a common technique to deal with such demands of a server is to establish rigid predefined allocations to entities demanding service, regardless of how much service they are actually demanding over time. The present invention allows the allocation of service to entities demanding service to be dynamically changed to take advantage of the available bandwidth of a network at any given time.

SUMMARY OF THE INVENTION

The present invention pertains to an apparatus for providing service to entities. The apparatus comprises a server for providing service. The apparatus comprises a first entity which requires the service of the server. The first entity is connected with the server. The apparatus comprises a second entity which requires the service of the server. The second entity is connected with the server. Also, the apparatus comprises a scheduler for dynamically scheduling when the first and second entity receives service from the server.

The present invention pertains to a scheduler for controlling when N entities, where N is an integer greater than or equal to 1, are operated upon by a server. The scheduler comprises a controller which chooses entities to receive service by the server based on a weighting factor corresponding with an entity. The controller dynamically changes the weighting factor corresponding with the entity as a function of a desired condition and time. The scheduler comprises a communication mechanism for communicating with entities. The communication mechanism is connected to the controller.

The present invention pertains to a method for serving entities. The method comprises the steps of providing service to a first entity by a server at a first rate based on a first weighting factor corresponding to the first entity during a first time period. Next there is the step of providing service to a second entity by the server at a second rate based on a second weighting factor corresponding to the second entity during the first time period. Then there is the step of changing the first weighting factor and second weighting factor dynamically to a third weighting factor and a fourth weighting factor, respectively, corresponding to the first entity and second entity, respectively. Next there is the step of providing service to the first entity by the server at a third rate based on the third weighting factor corresponding to the first entity during a second time period. Then there is the step of providing service to the second entity by the server at a fourth rate based on the fourth weighting factor corresponding to the second entity during the second time period.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
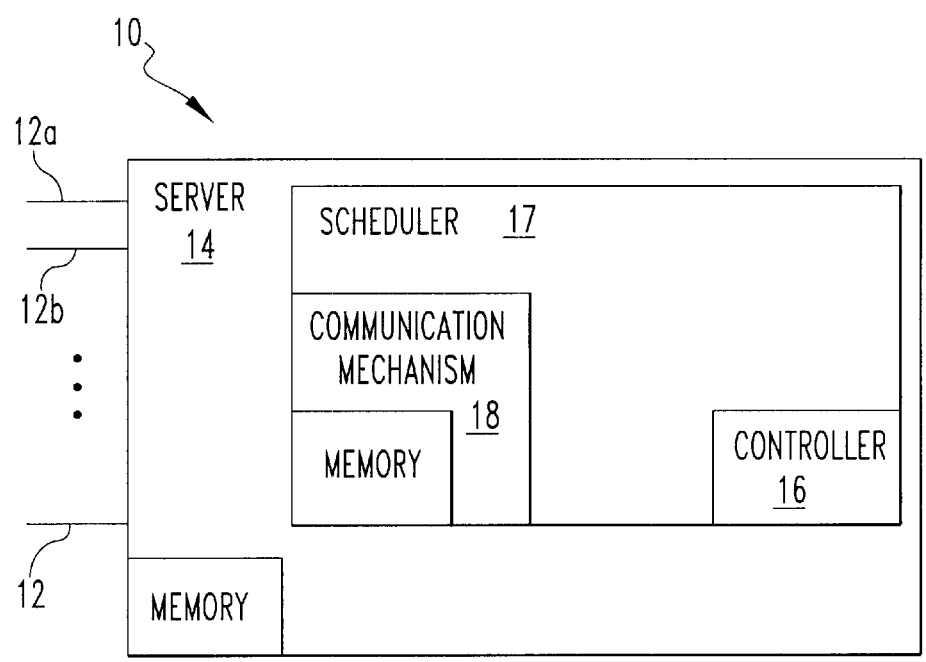
FIG. 1 is a schematic representation of an apparatus of the present invention.

Referring now to the drawings wherein like reference numerals refer to similar or identical parts throughout the several views, and more specifically to FIG. 1 thereof, there is shown an apparatus 10 for providing service to entities 12. The apparatus 10 comprises a server 14 for providing service. The apparatus 10 comprises a first entity 12a which requires the service of the server 14. The first entity 12a is connected with the server 14. The apparatus 10 comprises a second entity 12b which requires the service of the server 14. The second entity 12b is connected with the server 14. Also, the apparatus 10 comprises a scheduler 17 for dynamically scheduling when the first and second entity 12b receives service from the server 14.

Preferably, the scheduler 17 provides the first service to the first entity 12a at a first rate during a first time period based on a first weighting factor of the first entity 12a and provides service to the second entity 12b at a second rate during the first time period based on a second weighting factor of the second entity 12b. The scheduler 17 changes the first weighting factor to a third weighting factor and the second weighting factor to a fourth weighting factor to correspond with a desired condition so the first entity 12a receives service from the server 14 during a second time period based on the third weighting factor of the first entity 12a and the second entity 12b receives service from the server 14 during the second time period based on a fourth weighting factor corresponding to the second entity 12b. The third rate and fourth rate are different from the first rate and the second rate, respectively, and the first time period is different from the second time period.

Preferably, the schedule changes the first weighting factor and the second weighting factor to the third weighting factor and the fourth weighting factor to correspond with the desired condition according to $$W_i = FS + \alpha \times (Ri - FS) \tag{1}$$

where $W_i$ is the ith weighting factor and i is an integer greater than 2, $$FS = \frac{1}{MAX(2, \#N + 1)}$$

where N is the number of entities requesting service, $\alpha < 1$ where $\alpha$ is a constant and Ri is the measured rate of the ith entity at the first time.

The present invention pertains to a scheduler for controlling when N entities 12, where N is an integer greater than or equal to 1, are operated upon by a server 14. The scheduler comprises a controller 16 which chooses entities 12 to receive service by the server 14 based on a weighting factor corresponding with an entity. The controller 16 dynamically changes the weighting factor corresponding with the entity as a function of a desired condition and time. The scheduler comprises a communication mechanism 18 for communicating with entities 12. The communication mechanism 18 is connected to the controller 16.

The present invention pertains to a method for serving entities 12. The method comprises the steps of providing service to a first entity 12a by a server 14 at a first rate based on a first weighting factor corresponding to the first entity 12a during a first time period. Next there is the step of providing service to a second entity 12b by the server 14 at a second rate based on a second weighting factor corresponding to the second entity 12b during the first time period. Then there is the step of changing the first weighting factor and second weighting factor dynamically to a third weighting factor and a fourth weighting factor, respectively, corresponding to the first entity 12a and second entity 12b, respectively. Next there is the step of providing service to the first entity 12a by the server 14 at a third rate based on the third weighting factor corresponding to the first entity 12a during a second time period. Then there is the step of providing service to the second entity 12b by the server 14 at a fourth rate based on the fourth weighting factor corresponding to the second entity 12b during the second time period.

Figure 2:
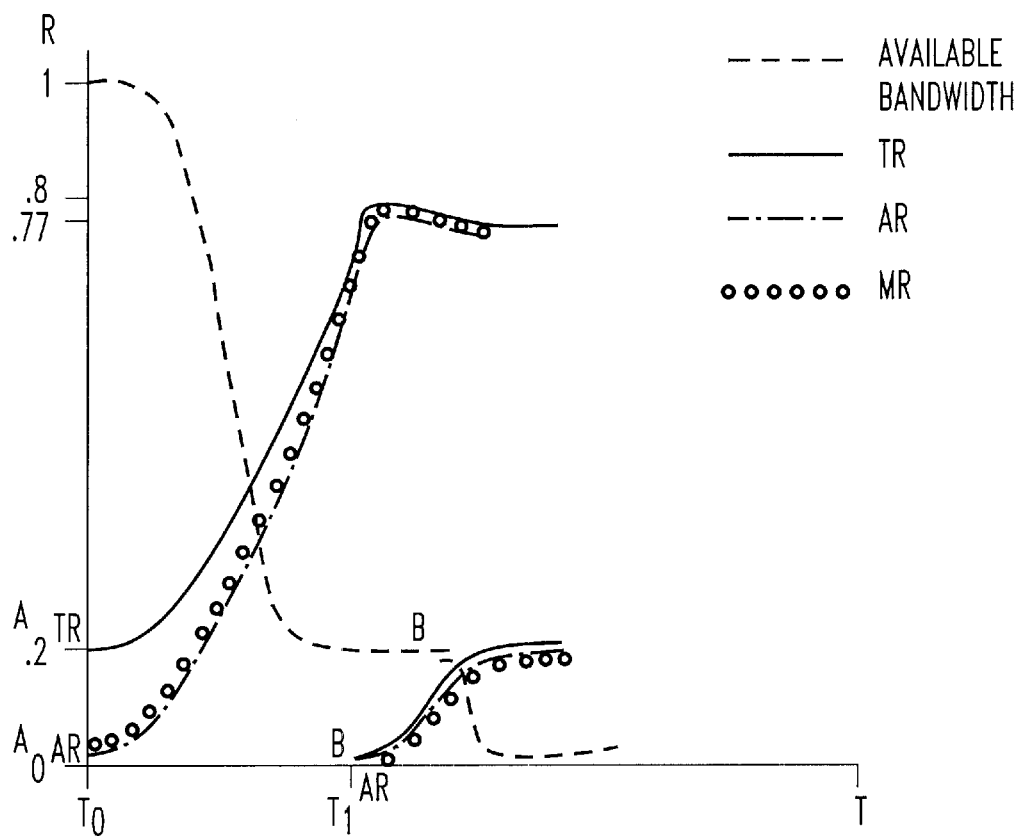
FIG. 2 is a schematic representation of a graph showing bandwidth allocation regarding the invention.

In the operation of the preferred embodiment, and by way of an example with reference to FIG. 2, the scheduler receives a request from a first entity A at time T0 for service from the server 14. First entity A has a transmission rate (TR) of 0.8. Applying Equation (1) to determine allocation rate (AR), where $\alpha=0.9$ and FS=0.5, since there is only one entity requesting service at time, T0 yields the following:

$$\alpha(TR-FS)+FS=AR$$

Substituting $$0.9(0.8-0.5)+0.5=0.77$$

Thus, and referring to FIG. 2, at time T1, the available bandwidth of the system has gone from 100% at time T0 when the request by the first entity A was initially made, to 23% at time T1 when the first entity A is receiving service; the allocation rate (AR) of the first entity A goes from 0 at time T0 to 77% at time T1 with a measured rate (MR) out to a port of a connection from the server 14 and the AR being 0.8 at time T1 from 0.2 at time T0.

At time T1 where the system has had time to stabilize in regard to the request by the first entity A, a second entity B having a transmission rate of 0.2, also requests service from the server 14. Now at time T1, FS=0.33 since there are two entities requesting service (FS=1/3). For the second entity B the equation at time T1 yields the following $$0.9(0.2-0.33)+0.33=-0.117+0.33=0.213=AR;$$

And for the first entity A $$0.9(0.8-0.33)+0.33=0.9(0.47)+0.33=0.423+0.33=0.753=AR.$$

From time T1 the server 14 provides the respective AR to each of the entities, as depicted in FIG 2, until some change occurs to the system. This is a simple example, but it shows the power of Equation (1) in regard to dynamically change the bandwidth available to entities over time, whether there are one, two or thousands of entities.

As is apparent, the scheduler having the algorithm in it is as either software or firm ware only concerns itself with the demands placed on it, not with what is occurring at other parts of the network or connection. If a comparison when more entities require service, then the scheduler can adapt the available bandwidth to accommodate the demands of the entities. Similarly, if at a given time fewer entities need service, then greater bandwidth can be made available to entities requesting service which has been freed by the entities which no longer need service at a given time.

Figure 3:
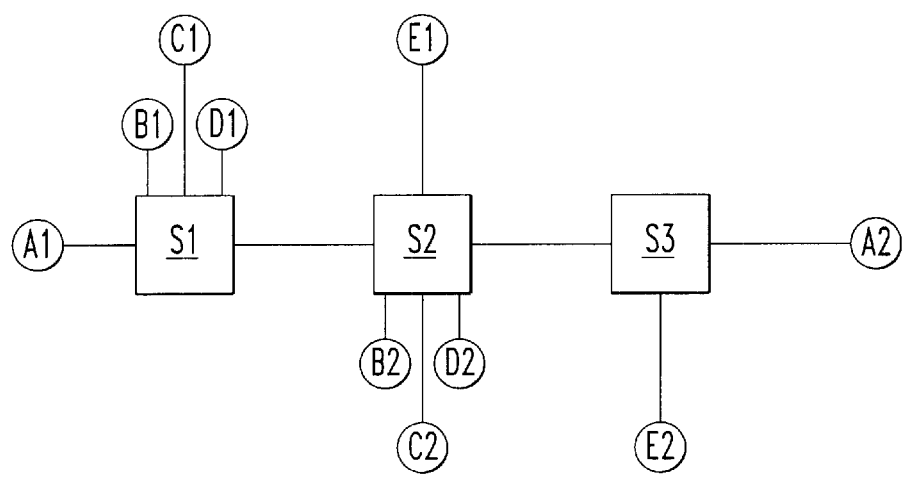
FIG. 3 is a schematic representation of an ATM network.

One possible application of the algorithm is with ATM. As shown in FIG. 3, four sources A1, B1, C1 and D1 connected to a switch S1 are transmitting ATM cells on an ATM network. The bandwidth of the network to a second switch S2 is allocated according to Equation (1) and according to a fair queue, as described in U.S. patent application 08/476, 365, incorporated by reference herein now Pat. No. 5,828, 878. The second switch S2 receives additional demand from source E1, but provides the respective ATM cells to the respective destinations B2, C2 and D2 of source B1, C1 and D1, respectively. According to the Equation (1) and the fair queue, the bandwidth of the network to a third switch S3 from the second switch S2 is allocated. The destinations A2 and E2 from sources A1 and E1, respectively, which are connected to the third switch S3, receive the respective ATM cells. If at any time one or more of the sources are not requiring service, there allocation can be provided to the other sources to allow the other sources to receive more service at a given time. The pseudo-code for the algorithm can be found in the Appendix.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

N = (# sessions with Q > 0) + 1
L = line rate
R = sum of reserved bandwidth = sum of SCRs + MCRs + L/Nrm (for backward RM cells)
E = "extra" bandwidth = L - R
FS = E/N
FS_i = fair share of session i
RFS_i = reverse fair share of session i
Q_i = session i queue depth
all per session variables exist at both ports the session passes through.
besides using the average interval of 100 cells to compute the fair share,
use an exponentialy weighted average of cell intervals
each time M cells of a given VC depart do
AVE_INT_i = (AVE_INT_i * Y) + ((time - LCT_i) * (1 - Y))
LCT_i = time
note: we might want two Ys one if (time - LCT_i) > AVE_INT_i and one if its
less so that we can make session rapidly increase their rates but decrease
them slowly, so that fast sessions do not suffer large losses when many
sessions start up.

APPENDIX-continued

```
when an reverse RM cell enters the switch, on port j, for the output
scheduler of port j do
FS_i = Max(0, (1/AVE_INT_i) - MCR)
if (Q_i = 0) &
     (time - LCT_i) > (Scheduler_Variation_Tolerance * AVE_INT_i) {
/* if there are no cells, and we have not seen one in a long time then
we need an event to decrease the fair share, in a production system we
should have a scavanger process to find dead sessions and reclaim their
allocation */
AVE_INT_i = (AVE_INT_i * Y) + ((time - LCT_i) * (1 - Y))
LCT_i = time
}
RM Cell stamping function
_i = per vc variable
_j = per port variable
queue_size_i
mcr_i
ave_rate_i
w_i
/* use the values for rate and weight, minus the vc's mcr, so that vc
competes fairly for the extra bandwidth */
ave_rate_m_mcr_i = ave_rate_i - mcr_i
w_m_mcr_i = w_i - mcr_i
range = Nrm = 32
ave (n,x,y)
{
return (((range-n)*x) + (n*y))/range;    /* linear weighted average
between x and y */
}
stamp(i)
{
/* limit the amount of increase due to FS, to prevent oscilations when
<100% load */
tmp_fs = min(.1,fs_j)
/* fs only appears in A and B since those two are for speeding up
connections, while C is for slowing them down, at which point we care
more about avoiding cell loss then fs*/
A = max    (ave_rate_m_mcr_i , w_m_mcr_i , fs)
B = median(ave_rate_m_mcr_i , w_m_mcr_i , fs) /* i.e. pick the 2nd largest
*/
C = min    (ave_rate_m_mcr_i , w_m_mcr_i);
/* possible that A,B,C may be made simpler in future*/
if queue_size_i < range {
    /* if queue if less then Nrm cells, make source go faster.
       objective, have at least Nrm cells in the buffer so that there
       is always at least one RM cell in the buffer */
    tmper = ave(queue_size_i, (A*1.5),A);
} else {
    if queue_size_i < (2*range) {
      tmper = ave(queue_size_i-range,A,B);
} else {
    if queue_size_i < (3*range) {
       tmper = ave(queue_size_i-(2*range),B,(C*.75));
    } else {
       tmper = C*.75;
    }
    ;
}
return tmper+mcr_i;
}
cell.er = min(cell.er, stamp(i))
```

---

What is claimed is:

1. An apparatus for providing service to entities comprising:

a server for providing the service;

a first entity which requires the service of the server, said first entity connected with the server;

a second entity which requires the service of the server, said second entity connected with the server; and a scheduler for dynamically scheduling when the first and second entity receives service from the server, said scheduler providing service to the first entity at a first rate during a first time period based on a first weighting factor of the first entity and providing service to the second entity at a second rate during the first time period based on a second weighting factor of the second entity, said scheduler changing the first weighting factor to a third weighting factor and the second weighting factor to a fourth weighting factor to correspond with a desired condition so the first entity receives service from the server during a second time period based on the third weighting factor of the first entity at a third rate and the second entity receives service from the server during the second time period based on a fourth weighting factor corresponding to the second entity, said third rate and fourth rate different from the first rate and the second rate, respectively, and the first time period different from the second time period, the scheduler changes the first weighting factor and the second weighting factor to the third weighting factor and the fourth weighting factor to correspond with the desired condition according to $$W_i = FS + \alpha \times (Ri - FS)$$

where $W_i$ is the ith weighting factor and i is an integer greater than 2, $$FS = \frac{1}{MAX(2, \#N + 1)}$$

where N is the number of entities requesting service, $\alpha < 1$ where $\alpha$ is a constant and Ri is the measured rate of the ith entity at the first time.

2. A method for serving entities comprising the steps of:
providing service to a first entity by a server at a first rate based on a first weighting factor corresponding to the first entity during a first time period;
providing service to a second entity by the server at a second rate based on a second weighting factor corresponding to the second entity during the first time period;
changing the first weighting factor and second weighting factor dynamically to a third weighting factor and a fourth weighting factor, respectively, corresponding to the first entity and second entity, respectively, according to $$W_i = FS + \alpha \times (Ri - FS)$$

where $W_i$ is the ith weighting factor and i is an integer greater than 2, $$FS = \frac{1}{MAX(2, \#N + 1)}$$

where N is the number of entities requesting service, $\alpha < 1$ where $\alpha$ is a constant and Ri is the measured rate of the ith entity at the first time;
providing service to the first entity by the server at a third rate based on the third weighting factor corresponding to the first entity during a second time period; and
providing service to the second entity by the server as a fourth rate based on the fourth weighting factor corresponding to the second entity during the second time period.

3. A scheduler for controlling when N entities, where N is an integer>1, are operated upon by a server comprising:
a controller which chooses entities to receive service by the server based on a weighting factor corresponding with an entity, said controller dynamically changing the weighting factor corresponding with the entity as a function of a desired condition and time, said controller providing service to a first entity at a first rate during a first time period based on a first weighting factor of the first entity and providing service to the second entity at a second rate during the first time period based on a second weighting factor of the second entity, said controller changing the first weighting factor to a third weighting factor and the second weighting factor to a fourth weighting factor to correspond with a desired condition so the first entity receives service from the server during a second time period based on the third weighting factor of the first entity at a third rate and the second entity receives service from the server during the second time period based on a fourth weighting factor at a fourth rate corresponding to the second entity, said third rate and fourth rate different from the first rate and the second rate, respectively, and the first time period different from the second time period, the scheduler changes the first weighting factor and the second weighting factor to the third weighting factor and the fourth weighting factor to correspond with the desired condition according to $$W_{i=FS} + \alpha \times (Ri - FS)$$

where $W_i$ is the ith weighting factor and i is an integer greater than 2, $$FS = \frac{1}{MAX(2, \#N + 1)}$$

where N is the number of entities requesting service, $\alpha < 1$ where a is a constant and Ri is the measured rate of the ith entity at the first time; and
a communication mechanism for communicating with entities, said communication mechanism connected to said controller.

* * * * *